BURST SEPARATOR CONTROLLED, CHROMA KILLER
Filed Dec. 16, 1954
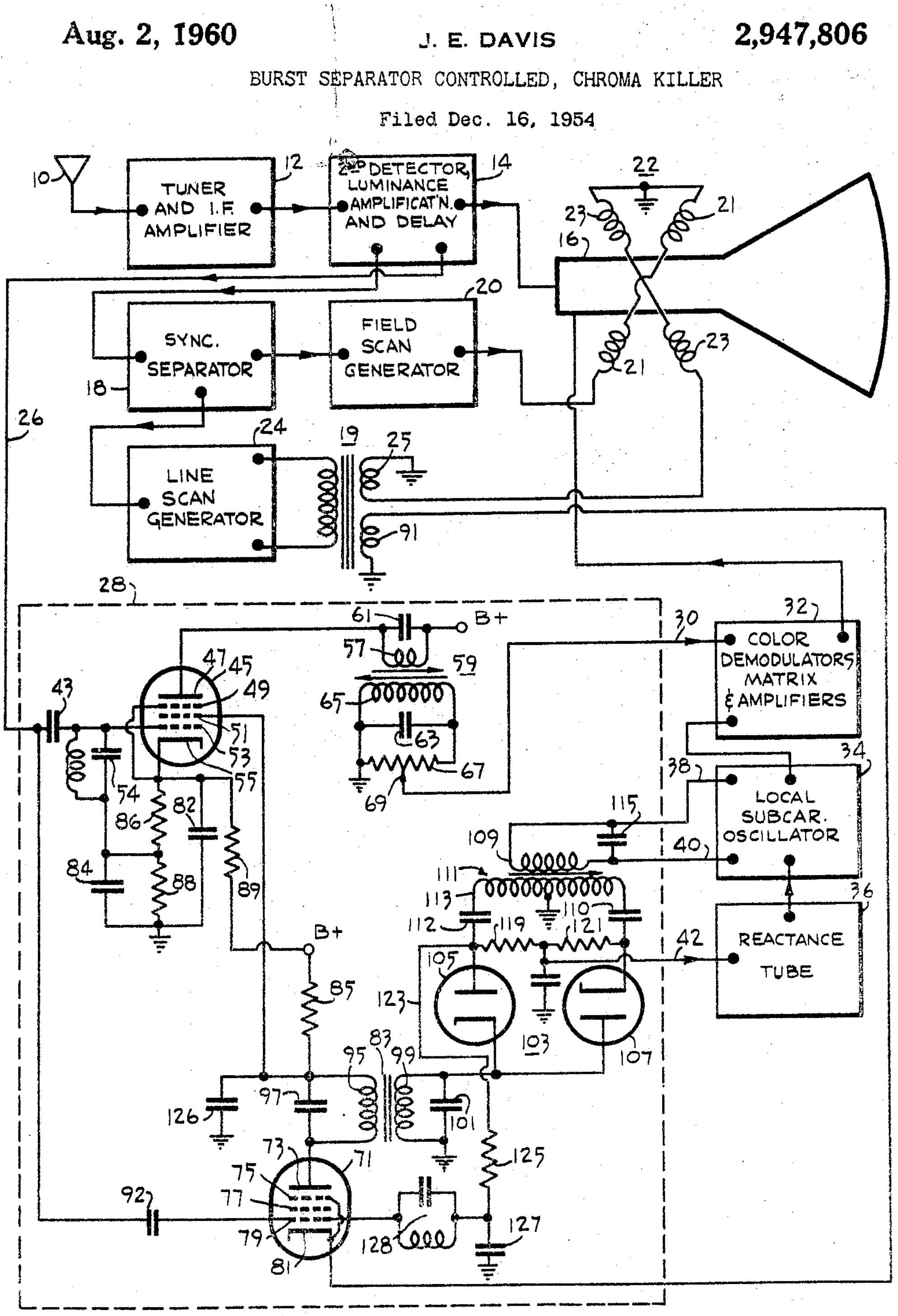
INVENTOR.
Joseph E. Davis
BY
Mason, Kolehmainen, Rathburn & Wyss
ATTORNEYS

United States Patent Office 2,947,806

Patented Aug. 2, 1960

2,947,806

BURST SEPARATOR CONTROLLED, CHROMA KILLER

Joseph E. Davis, Buffalo, N.Y., assignor, by mesne assignments, to Sylvania Electric Products Inc., Wilmington, Del., a corporation of Delaware Filed Dec. 16, 1954, Ser. No. 475,736

6 Claims. (Cl. 178—5.4)

The present invention relates to color television receivers, more particularly to the so-called chroma channel portion of color television receivers, and the invention has for an object the provision of a new and improved color burst synchronizing and chroma signal amplifying arrangement which is simple in construction and inexpensive to manufacture.

In present day color television receivers the modulated color subcarrier or chroma signal portion of the received color television signal is amplified in a band pass amplifier and the color burst synchronizing signal portion of the received color television signal is separated out and is employed to synchronize a color subcarrier oscillator in the receiver which develops color subcarrier reference waves of the proper phase relationship. The amplified chroma signal is demodulated by employing synchronous demodulators to which the chroma signal and color subcarrier reference waves are supplied so that the desired color-difference signals are produced. These color difference signals are then combined with the amplified luminance signal in a suitable matrix to provide the desired red, blue and green signals which are impressed upon the three electron guns of a tri-color picture tube. Since D.C. restorers are generally employed at the picture tube to maintain the desired D.C. level at the picture tube grids, it is necessary to remove the color burst signal from the chroma channel so that the D.C. restorers therein will not set up on the burst signal instead of the desired zero reference level. Such removal of the color burst signal from the chroma channel is commonly called burst killing.

When the color television receiver is employed to receive a black and white or monochrome signal, it is also desirable to disable the entire chroma channel of the color television receiver so that noise impulses and other disturbances which may be developed in or transmitted through the chroma channel are not impressed upon the picture tube. Such disabling of the chroma channel during monochrome reception periods may be called chroma killing.

It is, therefore, another object of the present invention to provide a new and improved color television receiver arrangement wherein the functions of burst killing and chroma killing are performed in a simple, economical and reliable manner.

It is a further object of the present invention to provide a new and improved color television receiver arrangement wherein the color burst signal is separated from the composite color television signal and is employed to synchronize the color subcarrier oscillator and also to disable the chroma channel during monochrome reception periods.

It is a still further object of the present invention to provide a new and improved color television arrangement employing a minimum number of circuit elements wherein the functions of color burst gating or separation, burst killing and chroma killing are efficiently carried out.

Another object of the present invention resides in the provision of a new and improved color television receiver arrangement employing a minimum number of circuit elements wherein the color burst is separated from the composite video wave, is amplified, and is employed to perform the functions of burst killing and chroma killing.

Briefly, in accordance with one aspect of the present invention a color burst gating and amplifier tube is provided which separates the color burst signal from the composite color television signal and amplifies the same. The color burst gating and amplifier tube is arranged to control the screen grid voltage of a chroma amplifier tube so that the color burst signal is removed from the chroma signal. Also, during monochrome reception no color burst signal is received and the color burst gating tube disables the chroma amplifier to prevent undesired noise impulses from being transmitted therethrough during monochrome reception periods.

The invention, both as to its organization and method of operation, together with further objects and advantages thereof, will best be understood by reference to the following description taken in connection with the accompanying drawings in which the single figure thereof is a somewhat diagrammatic schematic illustration of a color television receiver employing the improved circuits of the present invention.

Referring now to the drawing, there is shown a color television receiver which includes a conventional antenna 10 connected so as to supply a received color television signal to a tuner and intermediate frequency amplifier 12 wherein a particular set of audio and video carrier waves are selected and reduced in frequency to corresponding modulated waves of an intermediate frequency. Since the audio circuits of color television receivers are well known and do not constitute a part of the present invention, for purposes of clarity these audio circuits are not shown in the circuit diagram of Fig. 1. The video and color subcarrier modulated intermediate frequency wave appearing at the output of the tuner and I.F. amplifier 12 is applied to the second detector luminance amplifier and delay circuit 14 wherein the intermediate frequency wave is detected and the luminance signal is amplified and delayed. In the particular receiver illustrated, the amplified luminance signal is supplied directly to the control grids or cathodes of a conventional three-gun color television picture tube 16 wherein the luminance signal is added to the color difference signals in the conventional manner to control the intensity of the cathode ray beams thereof in accordance with the desired red, blue and green signals. The detected cathode ray deflection synchronizing wave is supplied to a conventional sync separator circuit 18 wherein the field synchronizing pulses are separated from the line synchronizing pulses for application to a field scanning generator 20. The output of the field scanning generator 20 is, conventionally, a saw tooth wave having a frequency of 60 cycles per second which is supplied to the vertical deflection coils 21 of a deflection yoke assembly 22. The line synchronizing pulses from the sync separator 18 are supplied to a line scan generator 24 which develops a suitable horizontal scanning wave in the secondary winding 25 of the horizontal deflection output tranformer 19, the winding 25 energizing the horizontal sweep coils 23 of the yoke assembly 22.

The detected wave which is present at the output of the second detector portion of the circuit 14 is composite in nature and contains the chroma modulated subcarrier wave in addition to the video and synchronizing waves. This composite wave is coupled by means of a conductor 26 to a combination burst gate, burst amplifier, burst killer, chroma killer and chroma amplifier circuit contained within the dotted lines 28. In accordance with the present invention the circuit 28 separates the chroma signal from the burst and video signals, is amplified, and is produced on the output conductor 30 for application to the chroma demodulators, matrix and amplifiers 32. The demodulated color difference signals which are produced at the output of the circuit 32 are supplied directly to the color television tube 16 for addition with the luminance signal supplied thereto from the luminance amplifier 14. In order to demodulate the chroma signal in the circuit 32 it is necessary to provide at the receiver a wave varying at the color subcarrier frequency. This wave is supplied from a local subcarrier oscillator 34, the frequency of which is controlled by means of a phase detector 103, to be described in more detail hereinafter, and a conventional reactance tube 36. Thus, a portion of the subcarrier oscillation wave from the local subcarrier oscillator 34 is coupled by means of conductors 38 and 40 to the phase detector 103 wherein it is compared with the color burst signal to produce on the conductor 42 a direct voltage signal which is indicative of the phase relationship of the local subcarrier wave and the received color burst signal. This direct voltage wave on the conductor 42 is used in a conventional manner in conjunction with the reactance tube 36 to synchronize the local subcarrier oscillator 34 with the received color burst signal.

With the exception of those circuits shown within the dotted lines 28, the construction and operation of the television receiver thus far described is conventional in that a television signal received by the antenna 10 is applied to the tuner 12 for amplification and selection, before being supplied to the second detector circuit 14 wherein the video carrier is removed from the received wave to provide the video and modulated color subcarrier wave, and the synchronizing waves. The horizontal and vertical deflection synchronizing components of the received signal are separated by the separator 18 and are applied to the respective horizontal and vertical scanning systems 20 and 24 to control the synchronized operation thereof. The scanning signal applied from the output circuit of the generator 20 to the vertical scanning windings 21 and the scanning signal applied to the horizontal scanning windings 23 from the line scan generator 24 cause the cathode ray beams of the tube 16 to sweep a plurality of horizontal lines to produce a television image. The reactance tube 36, the local subcarrier oscillator 34 and the chroma demdoulator circuits 32 also operate conventionally in that they detect and amplify the color difference signals and supply them to the color picture tube 16 for addition to the luminance signal. Whereas a higher degree of quality may be obtained by utilizing separate matrixing stages rather than utilizing the guns of the television tube 16 for this addition for purposes of describing the present invention this portion of the color television receiver has been shown in simplified form.

Referring now more particularly to the portions of the color television receiver embodying the present invention, a signal of composite wave form containing at least the chroma modulated color subcarrier wave and the color burst signal is supplied over the conductor 26 and through the coupling condenser 43 to the first control grid 53 of a pentode amplifier tube 45. The discharge device 45 also includes an anode 47, a suppressor grid 49, a screen grid 51, and a cathode 55. In the present embodiment the above described composite wave form is supplied to the control electrode 53 and a tuned circuit 54 is provided to select only the upper and lower sideband components of the color subcarrier signal, the circuit 54 having a band pass characteristic of from two to four megacycles. The color subcarrier or chroma signal is amplified in the tube 45 and appears in amplified form across the primary winding 57 of a band pass coupling transformer 59. A condenser 61 is provided across the primary winding 57 and a condenser 63 is provided across the secondary winding 65 of the transformer 59 so as to provide the desired chroma band pass characteristic. A potentiometer 67 is provided as a chroma control so that an adjustable amplitude chroma signal is developed at the arm 69 thereof. This chroma signal is supplied over the conductor 30 to the chroma demodulator circuits 32.

To prevent the color burst signal from appearing in the chroma output signal developed by the tube 45, there is provided a circuit arrangement whereby anode current of the tube 45 is cut off during periods when the burst signal is present in the received color television wave. More particularly, the color burst gating and amplifying tube 71 is employed as a control tube for the chroma amplifier tube 45. Thus, the tube 71, which is provided with an anode 73, a suppressor electrode 75, a screen electrode 77, a control electrode 79 and a cathode 81, has the primary circuit of a burst take off transformer 83 and a load resistor 85 connected in series between the anode 73 and the B+ supply, and the screen grid 51 of the chroma amplifier tube 45 is connected to the anode side of the resistor 85 so as to be controlled in accordance with the flow of anode current through the tube 71. The discharge device 71 is preferably a high transconductance tube of the type in which the plate current is substantially constant, down to a relatively low value of plate voltage, i.e., the plate current versus voltage characteristic of the tube 71 has a knee which occurs at a relatively low plate voltage, in the order of fifty volts. The cathode 55 of the chroma amplifier tube 45 is biased positively by means of the resistor 89, which is connected between the cathode 55 and the B+ terminal, and the resistors 86 and 88 connected between the cathode 55 and ground, so that the cathode 55 is operated positively with respect to ground by an amount corresponding to the knee of the current-voltage characteristic of the tube 71, i.e., fifty volts positive with respect to ground.

With this arrangement the screen grid to cathode voltage of the tube 45 is zero during periods when the gating tube 71 is conducting heavily. Since the control grid 53 of the tube 45 must be biased for amplification of the chroma signal supplied thereto, the tuned circuit 54 is connected to the junction point of the resistors 86 and 88 and the values of the resistors 89, 86 and 88 are so chosen that the correct control grid bias voltage is developed across the resistor 86. The bypass condensers 82 and 84 are provided so as to maintain the potential across the resistors 86 and 88 substantially constant. It may thus be seen, therefore, that by causing the tube 71 to conduct heavily during color burst periods anode current of the tube 45 is cut off since the screen grid to cathode voltage of the tube 45 during these periods will be zero.

In order to cause the tube 71 to conduct heavily during only the color burst intervals, the control grid 79 of the tube 71 is biased negatively with respect to ground, by means to be described in more detail hereinafter, so that the tube 71 is normally cut off. A negative gating pulse is derived from an auxiliary winding 91 on the horizontal output transformer 19, the winding 91 being connected between the cathode 81 of the tube 71 and ground. The negative gating pulse is induced in the winding 91 during the horizontal retrace intervals due to interruption of current flow through the primary winding of the transformer 19, as will be readily understood by those skilled in the art.

The composite signal on the conductor 26, which includes the color burst, is coupled through the condenser 92 to the control grid 79 of the tube 71. Since the color burst signal occurs immediately after the horizontal synchronizing pulses and during horizontal retrace intervals, the negative gating pulses developed across the winding 91 render the tube 71 highly conductive during retrace intervals so that the color burst signal is amplified through the tube 71 and appears in amplified form across the primary winding 95 of the transformer 83. The winding 95 is tuned to the color subcarrier signal frequency by means of the condenser 97 and the secondary winding 99 of the transformer 83 is tuned to this frequency by means of the condenser 101 so that only the amplified color burst signal, which consists of eight or nine cycles of the 3.58 mc. color subcarrier, is supplied to the phase detector 103.

Preferably, the negative gating pulse derived from the transformer 91 is suitably shaped and delayed by a pulse shaping network (not shown) so that the tube 71 is rendered conductive only during color burst intervals, i.e., the latter portion of the horizontal retrace interval. Also, it will be understood that this negative gating pulse may be derived from any other suitable portion of the receiver, as will be readily understood by those skilled in the art.

The phase detector 103 includes a pair of inversely connected diodes 105 and 107 which are supplied with a portion of the locally developed subcarrier wave developed by the oscillator 34. Thus, the conductors 38 and 40 are connected to the primary 109 of the detector transformer 111 and the secondary winding 113 of the transformer 111 is connected through the condensers 110 and 112 to the diodes 107 and 105. The primary winding 109 is tuned by the condenser 115 to approximately the desired color subcarrier frequency. The burst voltage which is developed across the secondary winding 99 is supplied to the cathode of the diode 105 and the anode of the diode 107. Since the operation of such detector circuits is well known the operation thereof is not described in more detail herein. There is thus developed at the junction between the load resistors 119 and 121 a substantially unidirectional voltage having a magnitude indicative of the phase relationship between the subcarrier oscillator voltage wave supplied to the detector transformer 111 and the color burst wave supplied to the diodes 105 and 107. This direct voltage control signal is supplied over the conductor 42 to the reactance tube 46 where it is used in the conventional manner to synchronize the local subcarrier oscillator 34 with the color burst signal.

The above described negative bias for the control grid 79 of tube 71 is derived from the phase detector 103. Also, an arrangement is provided wherein tube 71 is rendered highly conductive during periods when no color burst signal is received, that is, during monochrome reception periods. More particularly, the control grid 79 is connected through the tuned circuit 128 and the resistor 125 to the anode of the diode 105 in the phase detector 103. The circuit 128 is tuned to the color subcarrier frequency to permit separation of the composite signal impressed upon the control grid 79 from the biasing circuitry for grid 79. A condenser 127 is connected from the junction point, of the circuit 128 and the resistor 125, to ground to maintain the D.C. level of the control grid 79 substantially constant and to prevent interaction between the phase detector 103 and the tube 71. The amplitude of the color burst signal applied to the detector 103 through transformer 83 is considerably greater than the local subcarrier wave supplied thereto so that the negative D.C. voltage which appears at the anode of the diode 105 and across the resistor 119 is developed primarily in response to the burst signal supplied to the detector 103. For example, the voltage developed at this point may be minus twenty-five volts when burst signals are periodically received and may drop to minus three volts when burst signals are not periodically received, i.e., during monochrome signal reception periods.

Considering now the operation of the circuit just described, when a color television signal is received the composite detected signal is impressed upon both the tube 45 and the tube 71. During horizontal trace intervals the tube 71 is cut off by the negative bias supplied thereto from the phase detector circuit 103 so that the chroma modulated subcarrier wave is amplified through the tube 45 and is supplied to the color demodulator circuits 32. During the horizontal retrace interval, when the chroma signal is not present in the received wave, the bias on the burst amplifier tube 71 is overcome by the gating pulse (approximately twenty volts negative) supplied to the cathode 81 of the tube 71 so that the tube 71 becomes conductive and amplifies the color burst signal, the amplified color burst signal being supplied to the phase detector 103, by way of transformer 83. When the tube 71 is driven highly conductive by the negative gating pulse impressed upon the cathode thereof, the voltage drop through the resistor 85 lowers the screen voltage on the tube 45.

As described heretofore, the tube 71 is so chosen that when it is driven highly conductive the anode voltage will drop to approximately the same voltage as is produced across the cathode resistors 86 and 88 of the tube 45 so that the screen-grid to cathode voltage of the tube 45 is reduced to zero when the tube 71 is rendered highly conductive. A condenser 126 of low impedance to waves of burst frequency is connected from the junction point of the resistor 85 and condenser 97 to ground, to filter out the individual cycles of the color burst signal developed in the anode circuit of the tube 71 while maintaining the waveshape of the gating pulse impressed upon the cathode of the tube 71. Accordingly, the tube 45 is cut off for the duration of the gating pulse applied to the cathode 81 so that the color burst signal is not transmitted through the chroma amplifier tube 45 and the function of burst killing insofar as tube 45 is concerned is accomplished.

When a monochrome television signal is received, which contains no color burst signal, substantially no output voltage is developed by tube 71 for transmittal to transformer 83. As a result, the bias voltage developed at the anode of the diode 105 drops and the tube 71 is rendered continuously highly conductive irrespective of the gating pulse supplied to the cathode 81. Accordingly, the tube 45 is continuously cut off for monochrome reception so that noise signals or other disturbances are not produced to interfere with black and white reception and the function of chroma killing is accomplished.

While there has been described what is at present considered to be the preferred embodiment of the invention, it will be understood that various modifications may be made therein which are within the true spirit and scope of the invention.

What is claimed as new and is desired to be secured by Letters Patent of the United States is:

1. In a color television receiver, the combination of, a chroma amplifier adapted to be supplied with at least the chroma signal, a burst amplifier adapted to be supplied with at least the burst signal, means rendering said chroma amplifier ineffective in response to a voltage of less than a predetermined magnitude appearing in the output circuit of said burst amplifier, means responsive to said burst signal biasing said burst amplifier beyond cut-off, means responsive to a received signal for producing a scanning voltage wave, and means responsive to said scanning voltage wave for decreasing said bias to render said burst amplifier conductive during occurrence of said burst signal.

2. A color television receiver comprising a discharge device having an anode, a cathode and at least a first and second grid, for controlling the current therein, means for providing a reference potential at said cathode, means for supplying a signal to be amplified to said first grid, means for deriving an output wave from said anode, another discharge device having at least an anode, a cathode and a grid for controlling the current therein, means for supplying a signal to be amplified to said last named grid, means responsive to a received signal for supplying a bias between said grid and said cathode of said other discharge device to render it non-conductive, a source of gating pulses of voltage, means for supplying said pulses of voltage between said grid and said cathode of said other discharge device, and means connecting an output voltage of said other discharge device to said second grid of the first named of said discharge devices.

3. In a color television receiver, the combination of, a source of a signal having a composite wave form including a chroma wave and a burst wave, a first discharge device having an anode, a cathode, a control electrode, and a screen electrode, a circuit adapted to connect said composite wave to said control electrode, a circuit for deriving said chroma wave from said anode, a source of a reference potential, a circuit connecting said last named source to said cathode, a second discharge device having an anode, a cathode and a control grid, a circuit adapted to supply said composite wave form between said control grid and said cathode of said second discharge device, a circuit for deriving said burst wave from said anode of said second device, a circuit responsive to an output from said second discharge device for developing a potential substantially equal to said reference potential, a circuit for coupling said developed potential to said screen electrode, means for biasing said control grid substantially negative with respect to said cathode of said second discharge device, and means for substantially reducing said bias during occurrence of said burst wave.

4. In a color television receiver, a pentode tube amplifier for selectively amplifying chroma signals; a pentode tube amplifier for selectively amplifying burst signals; a source of plate potential, a resistor connected between said source and the plate of said burst amplifier, a connection from the plate side of said resistor to the screen grid of the chroma pentode tube amplifier; a detector producing negative biasing voltages from burst components selectively amplified by said pentode burst amplifier; means for applying to the control grid of the burst pentode amplifier said detected negative voltages; means producing pulses of voltage of negative polarity during intervals when burst components appear; and, means for applying said last mentioned negative voltage pulses to the cathode of said burst pentode amplifier.

5. An arrangement for alternately and sequentially occurring variable electrical impulses, one having the character of a modulated wave and the other impulse having the character of a keyed wave, a pentode tube amplifier for selectively amplifying the modulated impulses; a pentode tube amplifier for selectively amplifying the keyed impulses; a source of plate potential; a resistor connected between said source and the plate of said keyed impulse amplifier; a connection from the plate side of said resistor to the screen grid of the modulated impulse pentode tube amplifier; a detector producing negative biasing voltages from keyed impulse components selectively amplified by said pentode keyed impulse amplifier; means for applying to a control grid of the keyed impulse pentode amplifier said detected negative voltages; means for producing voltages of negative polarity during intervals when keyed impulses occur; and means for applying said last mentioned voltages derived during intervals when said keyed impulses occur, to the cathode of said keyed impulse pentode tube amplifier.

6. In a color television receiver wherein color pictures are produced from a composite wave having chroma and burst components, a pentode tube amplifier for amplifying chroma components having an anode, a cathode, a control grid and a screen grid; means for feeding the composite wave to the control grid and cathode of said amplifier; an output circuit for passing amplified chroma components, connected between the anode and cathode of said amplifier; a burst amplifier having an anode, a cathode and a control grid; means for feeding the composite wave to the control grid and cathode of said burst amplifier; an output circuit, for passing burst components, connected between the anode and cathode of said burst amplifier; a local reference oscillator; a detector; means connecting said reference oscillator and the output circuit of said burst amplifier to said detector; means feeding biasing voltage developed by said detector to the control grid of said burst amplifier; a source of positive potential; a resistor connecting said source to the anode of said burst amplifier; means connecting said resistor to the screen grid of said pentode tube chroma amplifier whereby the voltage applied to the screen grid is reduced as current flow through said resistor is increased; means for producing pulses of control voltage during retrace intervals when burst components occur; and, means for applying said control voltage pulses to the cathode of said burst amplifier.

References Cited in the file of this patent

UNITED STATES PATENTS

| | | |
|---|---|---|
| 2,111,567 | Lowell | Mar. 22, 1938 |
| 2,736,765 | Lohman | Feb. 28, 1956 |
| 2,752,417 | Pritchard | June 26, 1956 |
| 2,790,846 | Keizer | Apr. 30, 1957 |
| 2,835,728 | Flood | May 20, 1958 |
| 2,835,729 | Flood | May 20, 1958 |

OTHER REFERENCES

RCA Service Data, Model CT. 100 Color Television Receiver, March 31, 1954; pages 5, 32, and 33. (Copy in Division 16.)

Admiral, Introduction to Color Television, February 1954, pages 2, 36. (Copy in Patent Office Library.)